June 27, 1950  M. E. HARDING  2,513,170
TELESCOPIC VEHICLE FORK
Filed March 30, 1948  2 Sheets-Sheet 1
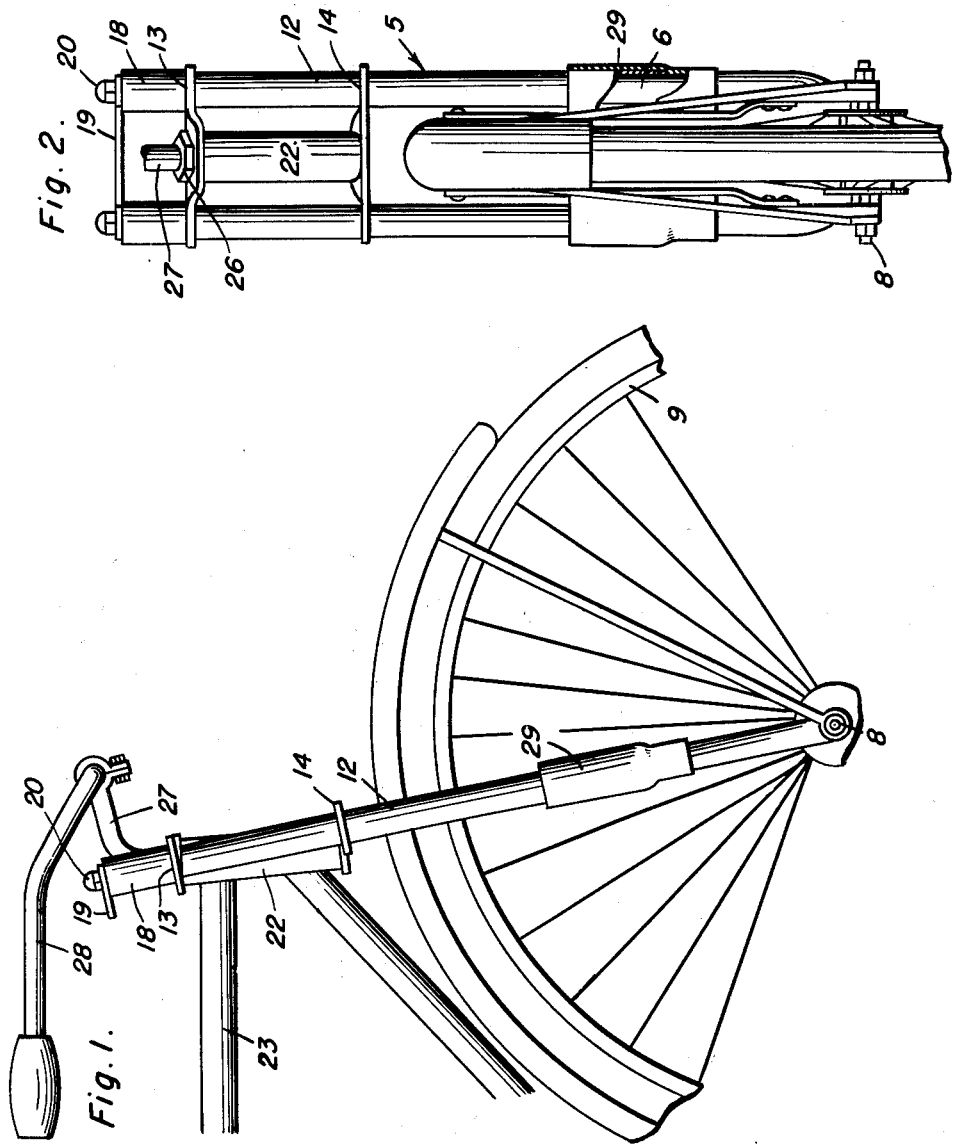
Mahlon E. Harding
INVENTOR.

June 27, 1950 — M. E. HARDING — 2,513,170
TELESCOPIC VEHICLE FORK
Filed March 30, 1948 — 2 Sheets-Sheet 2

Mahlon E. Harding
INVENTOR.

BY *Clarence A. O'Brien and Harvey B. Jacobson*
Attorneys

Patented June 27, 1950

2,513,170

UNITED STATES PATENT OFFICE 2,513,170

TELESCOPIC VEHICLE FORK

Mahlon E. Harding, Topeka, Kans., assignor of one-third to Stanley W. Newton and one-third to Monte L. Mark, Topeka, Kans.

Application March 30, 1948, Serial No. 17,913

2 Claims. (Cl. 280—276)

The present invention relates to bicycles and more particularly to the front or steering fork thereof.

An important object of the invention is to provide a novel front fork and front fork assembly constructed to cushion and absorb shock ordinarily subjected to the fork and frame of the bicycle or other vehicle, thereby increasing the comfort of the rider and materially increasing the life of the bicycle.

A further object of the invention is to provide a telescoping front fork assembly having spring means mounted therein arranged to absorb shock between the wheel and fork and the frame of the vehicle.

A still further object is to provide dust and weather-proof protecting means for the telescopic part of the fork assembly whereby to reduce wear of the working parts of the device.

A still further object is to provide a device of this character of simple and practical construction, which is strong and durable, efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view;

Figure 2 is a front elevational view with parts broken away and shown in section;

Figure 3:
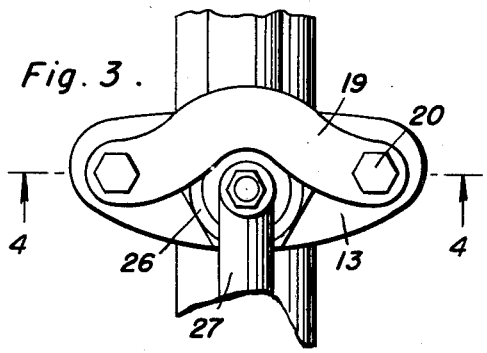
Figure 3 is a top plan view.
Figure 5:
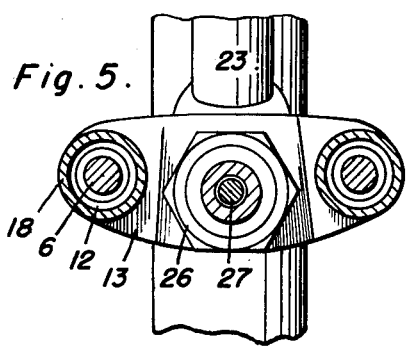
Figure 4:
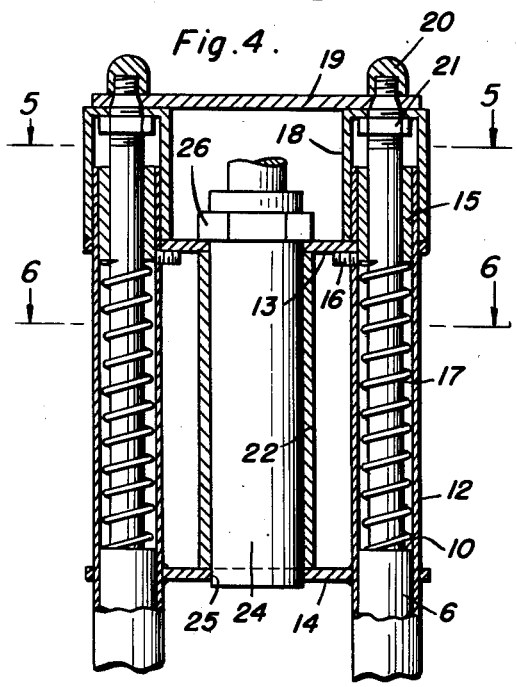
Figure 4 is a fragmentary vertical sectional view taken substantially on a line 4—4 of Figure 3.
Figure 6:
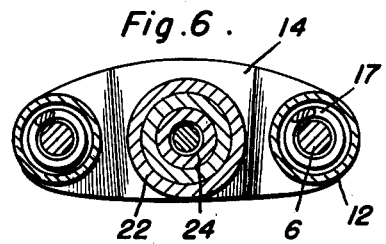
Figure 7:
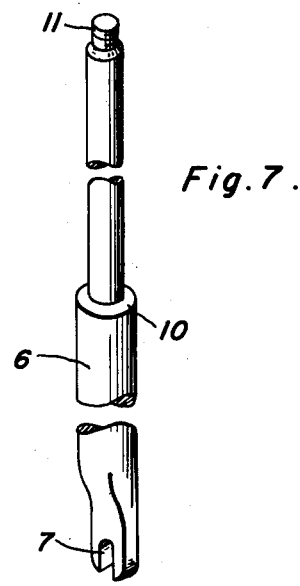
Figure 8:
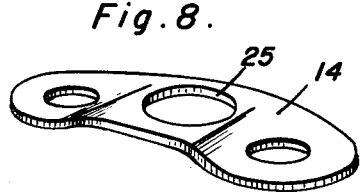

Figures 5 and 6 are transverse sectional views taken respectively on the lines 5—5 and 6—6 of Figure 4;

Figure 7 is a perspective view of one of the plungers of the fork, and;

Figure 8 is a perspective view of one of the fork connecting plates.

Referring now to the drawings in detail wherein for the purpose of illustration I have disclosed a preferred embodiment of the invention the numeral 5 designates the front fork generally for a bicycle or similar form of vehicle, the fork comprising a pair of plungers 6 having a notch 7 at their lower ends for attaching to the hub 8 at the opposite sides of a front bicycle or vehicle wheel 9. A shoulder 10 is formed on the plunger intermediate its ends and the upper end of the plunger is provided with a reduced threaded stem 11.

The plungers are slidably mounted in a pair of sleeves 12 rigidly connected to each other by an upper plate 13 and a lower plate 14 to space the sleeves in parallel relation with respect to each other.

A bushing 15 is secured in the upper portion of each sleeve by means of welding, brazing or a set screw 16 and a coil spring 17 surrounds the upper portion of plunger 6 within the sleeve and with the upper end of the spring bearing against the bushing 15 and the lower end of the spring bearing against the shoulder 10.

Dust caps 18 are sleeved over the upper ends of sleeves 12 for sliding movement thereof, the threaded stem 11 of plunger 6 projecting upwardly through the top of the dust caps for attaching to an equalizer plate 19 by upper and lower nuts 20 and 21 threaded on the plunger, the lower nut 21 being positioned under the top of the dust caps 18 to connect the plungers, dust caps and equalizer plate for uniform reciprocating movement relative to the sleeves 12.

A steering spindle housing 22 is secured in a vertical position at the front end of the frame 23 of the bicycle, the housing 22 being disposed between the upper and lower plates 13 and 14. A steering spindle 24 is freely rotatable in housing 22 with its lower end welded or otherwise suitably secured in an opening 25 in the lower plate 14 and its upper end secured to the upper plate 13 by a nut or the like 26. An arm 27 extends forwardly from the upper end of spindle 24 and to which the handle bars 28 are clamped.

The lower end of sleeves 12 are enclosed in a dust and weather-proof sleeve 29 of leather or other suitable material.

In the operation of the device the lower ends of plungers 6 of the fork are secured to the hub of the front wheel 9 and road shocks of the wheel are absorbed by the springs 17 which provide a yieldable mounting for the plungers in sleeves 12.

The front wheel is steered by the spindle 24 rotating in housing 22 which is stationary on frame 23, the spindle being connected to upper and lower plates 13 and 14 of the fork assembly.

In view of the foregoing description taken in conjunction with the accompanying drawings it is believed that a clear understanding of the device will be quite apparent to those skilled in this art. A more detailed description is accordingly deemed unnecessary.

It is to be understood, however that even though there is herein shown and described a preferred embodiment of the invention the same is susceptible to certain changes fully comprehended by the spirit of the invention as herein described and the scope of the appended claims.

Having described the invention, what is claimed as new is:

1. A vehicle front fork and assembly comprising a pair of plungers connected at one end to the hub of a wheel, a pair of sleeves mounted for extensible movement on the plungers, yieldable means between the plungers and sleeves constantly urging said plungers and said sleeves to a spread position, a steering spindle for the sleeves, means rigidly supporting the sleeves to a vehicle frame for bodily rotation of the sleeves about the longitudinal axis of the spindle, and equalizing means rigidly connecting the upper ends of the plungers to each other for uniform reciprocating movement in the sleeves, said equalizing means comprising a plate connected to the plungers, and dust caps held on top of the sleeves by the plate.

2. In a vehicle front fork and assembly comprising a pair of plungers connected at one end to the hub of a wheel, a pair of sleeves mounted for telescoping movement on the plungers, yieldable means between the plungers and sleeves, a steering spindle for the sleeves, means rigidly supporting the sleeves to a vehicle frame for bodily rotation of the sleeves about the axis of the spindle, and equalizing means rigidly connecting the upper ends of the plungers to each other for uniform reciprocating movement in the sleeves, said equalizing means comprising a plate connected to the plungers, and dust caps slidable on the tops of the sleeves and connected to the plate.

MAHLON E. HARDING.

REFERENCES CITED

The following references are of record in the file of this patent:

UNITED STATES PATENTS

| Number | Name | Date |
|---|---|---|
| 438,124 | Warwick | Oct. 7, 1890 |
| 680,493 | Meunier | Aug. 13, 1901 |

FOREIGN PATENTS

| Number | Country | Date |
|---|---|---|
| 330,648 | Great Britain | June 12, 1930 |
| 366,378 | France | July 26, 1906 |